United States Patent [19]

Pate et al.

[11] 4,209,661

[45] Jun. 24, 1980

[54] CONDUCTOR CLAMPING DEVICE

[75] Inventors: Harold T. Pate, Cleveland; Glenn A. Wozniak, Chagrin Falls, both of Ohio

[73] Assignee: Indian Head Inc., New York, N.Y.

[21] Appl. No.: 887,069

[22] Filed: Mar. 16, 1978

[51] Int. Cl.² ............................................. H02G 7/04
[52] U.S. Cl. ................................ 174/65 R; 24/136 R; 285/421; 339/103 R
[58] Field of Search ................... 174/65 R, 135, 65 G; 339/103 R, 103 B, 103 C, 107; 24/136 R, 136 L, DIG. 22, 171, 194, 115 M, 122.6, 263 DT; 285/421; 403/367, 368, 369, 374, 41, 243; 248/56

[56] References Cited

U.S. PATENT DOCUMENTS

| | | | |
|---|---|---|---|
| 1,317,735 | 10/1919 | Skelly | 339/107 X |
| 1,820,479 | 8/1931 | O'Brien | 24/263 DT |
| 2,054,612 | 9/1936 | White | 339/103 R X |
| 2,427,742 | 9/1947 | Peterson et al. | 174/65 G X |
| 2,828,147 | 3/1958 | Peiffer | 285/421 X |
| 2,916,785 | 12/1959 | Daugert | 24/136 R |
| 3,056,852 | 10/1962 | Sachs | 339/103 B X |
| 3,243,206 | 3/1966 | Samer | 174/65 G X |
| 3,300,163 | 1/1967 | Randolph | 174/65 G X |
| 3,352,961 | 11/1967 | Simon | 174/65 R |
| 3,493,205 | 2/1970 | Bromberg | 248/56 |
| 3,670,094 | 6/1972 | Mattson | 174/65 R |

FOREIGN PATENT DOCUMENTS 2259462  8/1975 France ........................................ 174/135

Primary Examiner—Thomas J. Kozma
Assistant Examiner—D. A. Tone
Attorney, Agent, or Firm—William R. Laney

[57] ABSTRACT

A clamping device comprising an elongated wedge body having a bifurcated end, and a second end opposite the bifurcated end. The wedge body is of substantially rectangular transverse cross-sectional configuration, and is relatively thick at the second end, tapering to a relatively thin dimension at the bifurcated end. The wedge body has first and second sides extending between its bifurcated and second ends. Each of these sides carries a plurality of longitudinally spaced, contiguous teeth or serrations over a major portion of its length. The bifurcation in one end of the wedge body defines a pair of spaced, substantially parallel legs, which legs have continuations of the teeth or serrations extended along one side thereof, and are relatively smooth on the opposite side thereof. In a useful combination, the clamping device retains an electrical conductor in place at the location where it enters a knock-out window in a synthetic resin electrical box. The clamping device is wedged between the conductor and the portion of the box which defines the window so that the serrations carried on opposite sides of the wedge body engage, respectively, the synthetic resin of the box and the insulating jacket of the conductor to firmly clamp the conductor in position.

4 Claims, 8 Drawing Figures

U.S. Patent  Jun. 24, 1980  4,209,661
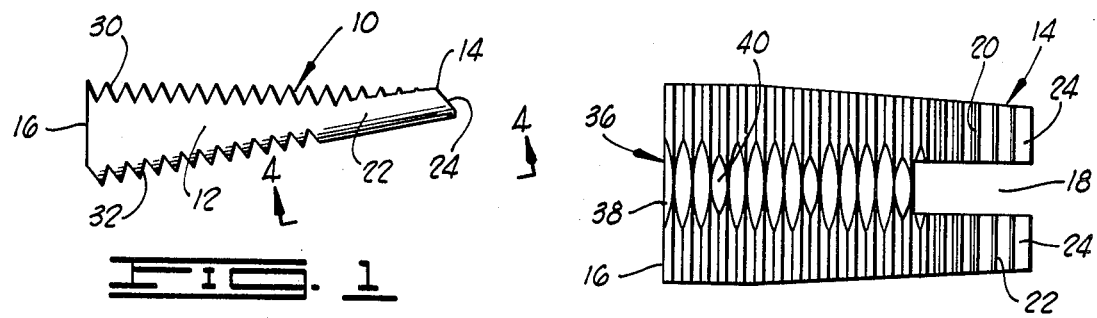
FIG. 1
FIG. 2
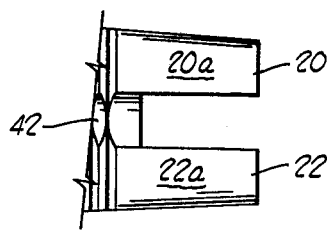
FIG. 4
FIG. 3
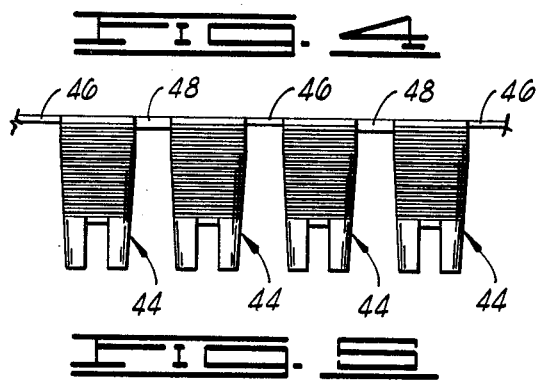
FIG. 5
FIG. 6
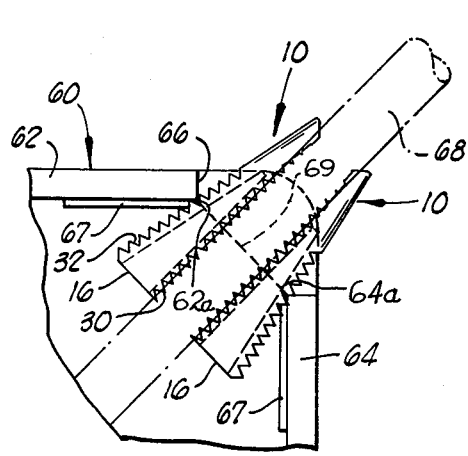
FIG. 7
FIG. 8

CONDUCTOR CLAMPING DEVICE

BACKGROUND OF THE INVENTION

1. Field of the Invention

This invention relates to clamping devices used for anchoring or clamping electrical conductors to electrical terminal or outlet boxes at the location where the conductor passes through an opening in the box.

2. Brief Description of the Prior Art

Various devices have been utilized for holding an end of an electrical conductor within an opening formed in a synthetic resin electrical outlet or terminal box so as to prevent the working loose of the conductor, and its inadvertent disconnection or disengagement from the box. These devices have taken various forms, and have been the subject of various specifications and standards in the electrical contracting and installation industry.

More recently, the requirements of the various codes which control these types of installations have been made more stringent, and it is currently required that all conductors which enter two- or three-gang outlet boxes and all ceiling boxes be firmly secured in the openings to these boxes in a manner such that they cannot be pulled from the box by an external force.

BRIEF DESCRIPTION OF THE PRESENT INVENTION

The present invention provides a simple, easily and inexpensively manufactured clamping device for retaining conductors of the type carrying a non-conducting insulating jacket in an opening through which the conductor is passed in the course of installing the conductor for electrical service. More specifically, the clamping device of the invention is particularly useful for holding an end or midportion of a conductor in a precise location where such end or midportion of the conductor enters a window or opening formed in a synthetic resin terminal or outlet box, so that the conductor cannot be extracted or pulled from this location by an external force applied thereto.

Broadly described, and in one aspect, the clamping device of the invention comprises an elongated wedge which carries a plurality of teeth which mutually engage the box and the conductor by biting into or mechanically engaging both, so that the conductor is, in effect, interlocked with the box at the point where the wedge is used. More specifically and definitively, the present invention comprises an elongated wedge body which has, at one end thereof, a bifurcation which defines a plurality of co-directionally extending, substantially parallel legs. At its other end, the elongated wedge body is relatively thick. Stated differently, in a preferred embodiment of the invention, the wedge body is of rectangular, transverse cross-sectional configuration, and the thickness of the wedge body at one end (the width of the rectangle in cross-section) is substantially greater than the thickness thereof at the opposite end of the wedge body where the legs are located and defined by the bifurcation formed therebetween.

Over its length, the wedge body has a pair of opposite side surfaces, and these surfaces each carry a plurality of contiguous, longitudinally consecutive teeth or serrations. The teeth or serrations continue all the way to the free ends of the two legs of the wedge body on one side of these legs. On the other side of the legs, however, no teeth are formed and this side of each of the legs is smooth.

In the use of the clamping device, one or a plurality of the clamping devices is forced between the insulation around a conductor extending through an opening in an electrical box, and that portion of the box which defines the opening. The relatively narrow end of each wedge body at which the legs are located is initially passed through the opening between the conductor and the box. As the wedge body of each clamping device is forced further through the opening, the increasing thickness of the wedge body causes the teeth or serrations carried on the opposite sides thereof to bite into the insulating jacket of the conductor, and also to ratchet along, and engage, an edge portion of the box adjacent which the opening is located. Initial insertion of the clamping device between the conductor and the box is facilitated by the relatively smooth surface carried at one of the sides of each of the legs.

When the clamping device is thus positioned and is forced firmly into a wedging and engaging position between the conductor and the box, a positive interlock of the conductor in the box is obtained, and the conductor cannot be pulled from the box by an external force. Such external force applied to the conductor only tends to more tenaciously force the wedge body of the clamping device into the space between the insulation jacket of the conductor and the synthetic resin box at the location of the opening, and thus the acting clamping force resisting extraction of the conductor becomes greater.

From the foregoing description of the invention, it will be apparent that it is an important object of the present invention to provide a relatively simple, easily manufactured clamping device which can be quickly and manually utilized for clamping a conductor in an opening into an electrical service box.

A further object of the invention is to provide a clamping device which can be used for clamping an electrical conductor in the opening in a synthetic resin electrical terminal or outlet box, which clamping device can be placed in position and utilized without the employment of any hand tools.

Another object of the present invention is to provide a clamping device for clamping an electrical conductor in the opening to a synthetic resin outlet box, which clamping device is versatile in its capability of clamping conductors of various diametric sizes in openings of varying sizes in such boxes.

An additional object of the invention is to provide a device for clamping an insulated electrical conductor in an opening in a way which does not break or destroy the integrity of the insulation around the conductor.

Additional objects and advantages of the invention will become apparent as the following detailed description of certain preferred embodiments of the invention is considered in conjunction with the accompanying drawings which illustrate the invention.

GENERAL DESCRIPTION OF THE DRAWINGS

FIG. 1 is a side elevation view of one embodiment of a clamping device constructed in accordance with the present invention.

FIG. 2 is a plan view of the clamping device illustrated in FIG. 1.

FIG. 3 is an end elevation view of the clamping device shown in FIG. 1.

FIG. 4 is a bottom plan view of the bifurcated end portion of the clamping device shown in FIG. 1.

FIG. 5 is a view in elevation of a plurality of the clamping devices of the invention as they can be concurrently molded in a single mold.

FIG. 6 is an end elevation view of a modified embodiment of the invention for larger size conductors and circular openings in synthetic resin boxes.

FIG. 7 is a side elevation view of a pair of the clamping devices of the invention in use for clamping a conductor, shown in dashed lines, in position at a location where the conductor passes through the opening to a synthetic resin electrical box.

FIG. 8 is a view similar to FIG. 7, but illustrating a single clamping device of the invention in use to clamp or retain a relatively large diameter conducter in position at the location where it passes through the opening to a synthetic resin electrical box.

DETAILED DESCRIPTION OF PREFERRED EMBODIMENTS OF THE INVENTION

Referring initially to FIGS. 1-4 of the drawings, a preferred embodiment of the present invention is shown therein with the clamping device of the invention being designated generally by reference numeral 10. The clamping device includes an elongated wedge body 12 which, as can be discerned from the end elevation view depicted in FIG. 3, is of generally rectangular cross-sectional configuration. The elongated wedge body 12 has a bifurcated end 14 and a second end 16 opposite the bifurcated end. At the bifurcated end 14 of the body 12, a large, substantially rectangularly configured bifurcation 18 is formed in the body and defines a pair of co-directionally extending, substantially parallel legs 20 and 22.

Referring to FIGS. 1 and 3, it will be perceived that the thickness of the body (or, in terms of the rectangular cross-sectional configuration, the width of this cross-section) is relatively greater at the end 16 of the body than at the bifurcated end 14 thereof. It will also be noted in referring to FIG. 1 that this thickness tapers gradually so that the thinnest portion of the body is at the free ends of the legs 20 and 22. In referring to these legs, it will be noted that each of the legs is cut along a bias at its free end so as to have a beveled or tapered surface 24 formed thereon.

It will also be noted in referring to FIG. 2 of the drawings that the end 16 of the wedge body 12 is substantially broader in a transverse sense than is the bifurcated end 14 thereof. Typically, the bifurcated end 14 of the wedge body 12 at which the legs 20 and 22 are located will be about 0.440 inch in transverse breadth, as measured from the outer side of one leg to the outer side of the other, and the breadth of the end 16 of the wedge body will be about 0.53 inch.

In referring to FIGS. 1, 2 and 4, it will be noted that at its opposite longitudinally extending sides, the wedge body 12 carries a plurality of contiguous transverse teeth or serrations which are serially arranged in a longitudinal array. The teeth at one side of the body are designated by reference numeral 30, and those at the other by reference numeral 32. It will be perceived that each of the series of teeth 30 and 32 extend over that portion of the body between the end 16 and the legs 20 and 22 thereof. Each of the legs 20 and 22 is characterized in having a smooth surface in alignment with that side of the body 12 which carries the teeth 32, and these surfaces of the legs are radiused at the outer edges thereof. The respective smooth surfaces of these legs 20 and 22 are designated by reference numerals 20a and 22a in FIG. 4. On the opposite sides of each of the legs 20 and 22, the transverse serrations or teeth 30 are continued out to the end of each of the legs. It will be noted in FIG. 1 that the outer tips or crests of the serrations or teeth 30 are in a straight line all the way from the end 16 of the wedge body to the end of the respective legs 20 and 22.

Superimposed upon the series of transverse teeth 30 are a plurality of surfaces which are each formed on a portion of an imaginary cylindrical figure. These surfaces are best illustrated in FIG. 2 of the drawings, where they appear in elevation as pointed ellipses. Two types of these surfaces are provided. One of these surface types 38 is formed as a portion of a relatively large radiused cylindrical figure, and thus is of relatively larger area and extends to a greater depth into the side of the wedge body 12. A relatively smaller area surface 40 is also provided and extends to a lesser depth into the side of the wedge body 12. This relationship is clearly illustrated in FIGS. 2 and 3 of the drawings. It will also be noted in referring to FIG. 2 that the arrangement is such that a plurality of the relatively deep, larger area surfaces 38 are provided between each pair of the relatively shallow smaller area surfaces 40. In the particular embodiment illustrated, four of the large area surfaces 38 are provided between each pair of relatively smaller area, shallower depth surfaces 40. The purpose of this arrangement will become clear from the ensuing description of the use and operation of the clamping device of the invention.

On the opposite side of the wedge body 12 from that which carries the teeth or serrations 30, a plurality of equi-sized surfaces, also formed on a portion of an imaginary cylindrical figure, are superimposed upon the teeth 32. These surfaces, designated by reference numeral 42, also appear, when viewed in elevation, as pointed ellipses, but, in keeping with their equal areas, all extend to the same depth in the wedge body 12. This uniformity of depth can be perceived in referring to the end view of the clamping device as shown in FIG. 3.

One of the merits of the clamping device of the invention is the ability to easily mold the clamping device from synthetic resin in such fashion that a plurality of the clamping devices are concurrently formed. An arrangement of this type, following molding, is illustrated in FIG. 5. Here a section of several of the clamping devices 44 interconnected by web portions 46 and 48 are illustrated as the structure appears upon completion of the molding operation. The relatively thick web portions 48 are used to prevent severance of adjacent pairs of clamping devices 44 so that the array can be broken up into pairs by breaking the thin web portions 46, and then sold in such pairs. It will be apparent, of course, that the wedge bodies may instead be molded in connected pairs, or even singly, if desired.

In FIG. 6 of the drawings, a modified embodiment of the invention is illustrated. Here, a plurality of elongated wedge bodies 50 are illustrated as the same are interconnected in circular array by a linking web 52 of synthetic resin. The structure can be molded in this form, and when so configured, can be used in a special and different way, as hereinafter explained, for securing and clamping a conductor within a circular opening through which the conductor is extended. It should be pointed out that the elongated wedge bodies 50 shown in FIG. 6 are formed substantially identically to that which is shown in FIGS. 1-4, except that each wedge body 50 is of arcuate cross-sectional configuration or, stated differently, the entire body is formed on a segment of a circle in cross-sectional configuration. The several wedge bodies 50 are joined at the relatively thick portion thereof near the end 16 by the web elements 52.

In FIGS. 7 and 8 of the drawings, two ways of using the clamping device of the invention are illustrated. In each instance, a part of a synthetic resin electrical box 60 is illustrated. The box 60 includes a pair of converging walls 62 and 64 which define at their intersection, a window or opening 66. Such construction of synthetic resin boxes used in electrical service as terminal boxes or outlets is well understood and conventional. In general, the window or opening 66 will be rectangular, and in one widely used construction, reinforcing ribs 67 are provided on the inner faces of the walls 62 and 64 adjacent the window. The purpose of the window or opening 66 is to permit an electrical conductor to be extended from the outside to the interior of the box 60 where it is connected to a terminal, or to another conductor or the like.

In FIG. 7, a relatively small electrical conductor 68 is shown entering the window or opening 66 in the box. The conductor 68 typically carries a cylindrical sheath of insulating material which surrounds the centrally disposed current-carrying wire or wires. In order to clamp the conductor 68 in the window or opening 66 so that it cannot be pulled out of the box 60, a pair of the clamping devices 10 of the invention are employed on opposite sides of the conductor. In positioning each clamping device, the relatively small bifurcated end 14 of the elongated wedge body 12 is initially passed through the space which exists between the peripheral surface of the conductor 68 and the adjacent edge of one of the side walls 62 or 64 of the box 60.

The bifurcated character of one end 14 of the wedge body 12, in conjunction with the relatively thin dimension of the body at this location, permits this end of the wedge body to be easily passed through the space which exists between the insulated conductor and the wall of the box 60. As previously pointed out, the window or opening 66 is rectangular. Such windows are therefore defined in part by edges 62a and 64a of the intersecting walls 62 and 64, with another boundary of the opening being that which is shown by the dashed line in FIGS. 7 and 8 and denominated by reference numeral 69. In order to assure that the wedge body 12 can pass through the opening 66 without being blocked by the walls defining the opposite sides of the opening in the transverse sense or, stated differently, the wall edges disposed transversely with respect to the wedge body, the bifurcation 18 is provided between the legs 20 and 22 so that they can be compressed inwardly to move toward each other as the wedge body is forced through the opening 66. Such passage is further facilitated by the smooth surfaces 20a and 22a carried at one of the sides of each of the legs 20 and 22, which smooth surfaces are placed opposite the terminal edges of the walls 62 and 64 which bound the window or opening 66. After the relatively thin, bifurcated end 14 of one of the clamping devices 10 has been inserted through the space between the conductor and one side of the window 66, a second clamping device is pushed into the space between the opposite side of the window and the opposite side of the conductor 68. This is accomplished in a way such that the relatively small diameter conductor 68 can be centered in the window or opening 66, and therefore both clamping devices will, of course, need to be partially inserted through the spaces at opposite sides of the conductor before they are wedged tightly into these openings. After both have been started through the spaces by insertion of the bifurcated ends 14 thereof through the openings from inside the box toward the outer side thereof, both are then forced firmly into a wedging position between the conductor and the opposite bounding sides of the window or opening 66.

As each clamping device 10 is forced further through the window or opening 66, the teeth 32 (carried on the side thereof opposite the side adjacent the conductor 68) ratchet along the straight edge formed at one side of the window. Also, the teeth 30 at the opposite side of the wedge body 12 are forced more and more deeply into the insulation jacket of the conductor 68. It should be pointed out, however, that the arrangement of the areas 38 and 40 on that side of the wedge body 12 which carries the teeth 30 is such that the sharp edges at the crests or ridges of the several teeth 30 are prevented from biting directly into the insulation on the conductor 68 to an extent such that it will be broken or cut through to expose the bare conductor. Firm retention of the conductor is assured by the occasional inclusion of the relatively shallow depth cavity or recess represented by each surface area 40, however, so that good engagement with the insulation jacket of the conductor is assured.

At the opposite side of the wedge body 12, the inclusion of the surfaces 42 of uniform area provides a relieved trough along the central axis of the wedge body 12 such that the ribs 67 carried on the inner surfaces of the walls 62 and 64 of the box (in a widely used construction) do not ride upon the crests of the teeth 32, thereby preventing the full transverse width of these teeth from coming into latching engagement with the respective edges of the walls 62 which define the windows or openings 66. In the completion of the clamping of the conductor 68 within the opening 66 in the box 60, force continues to be applied to the clamping devices 10 until each is forced approximately the same distance through the openings 66 and is firmly engaged with both those portions of the walls 64 and 66 of the box 60 which define the opening 66, and with the insulation jacket of the conductor 68.

It should be noted that the gradual enlargement of the transverse dimension or breadth of the wedge body 12 from the bifurcated end 14 thereof to the end 16 thereof, as shown in FIG. 2 of the drawings and hereinbefore described, assures that the clamping device will not be able to pass completely through the window or opening 66, and thus be lost to the outside of the box. This is of importance after installation of a pair of clamping devices 10 in the manner shown in FIG. 7, but also assures that prior to the time that the second clamping device is placed on the opposite side of the conductor 68 from that adjacent which the first clamping device is located, the first clamping device will not be able to slip through the window 66 from the inside of the box to the outside thereof. Stated differently, the increase in transverse breadth of the wedge body 12 which is characteristic of the clamping device of the invention is dimensionally pre-selected to correlate to the width of the window 66 into which the clamping device will be inserted so that it is not possible for the clamping device to pass completely through the window from the inside of the box.

It will be apparent, of course, that contact of the opposite sides of the wedge body 12 with the sides of the rectangularly configured window 66 will not occur prior to the time that clamping engagement with the conductor 68 is effected in the manner shown in FIG. 7. In other words, no interference with the further locking or engaging movement of the clamping devices to their fully seated positions is caused to occur by reason of the transverse jamming of each clamping device against the side walls of the window 66 prior to the time that such full seating of the clamping device has had an opportunity to be effected.

In the case of a relatively larger diameter conductor 70 as illustrated in dashed lines in FIG. 8, a single clamping device 10 may be most effective in securing the conductor in the opening or window 66. In fact, where the diameter of the conductor 70 is as large as that which is illustrated in FIG. 8, insufficient space is left between the periphery of the conductor and the window-defining edges of the walls 62 and 64 of the box 60 to permit more than one of the clamping devices 10 to be used. This single clamping device, however, functions very effectively to clampingly engage the conductor against removal.

In some instances, the embodiment of the invention illustrated in FIG. 6 is very useful. Here the interconnected elongated wedge bodies 50 are disposed in circular array, and are thus situated to be placed around a cylindrical conductor 68, and then forced into a circular opening in the side wall or at a corner of a synthetic resin box. In such instance, the clamping action is the same as that which has been herein described, and the manner in which the several wedge bodies move into the opening is also identical to that which has been hereinbefore described. The wedge bodies are, however, maintained in their symmetrical spatial relationship around the conductor, and thus tend to function with less possibility of displacement over extended periods of usage.

Although preferred embodiments of the invention have been herein described in order to illustrate, in exemplary fashion, the principles upon which the invention is based, it will be understood that various changes and innovations can be incorporated in the basic structures here disclosed without departure from these principles. Changes and innovations of this type are therefore deemed to be circumscribed by the spirit and scope of the invention except as the same may be necessarily limited by the appended claims or reasonable equivalents thereof.

What is claimed is:

1. In combination:
   a synthetic resin electrical box having side walls;
   a substantially rectangular opening through said side walls into said box;
   a generally cylindrical insulated electrical conductor having an end portion extending through said opening into the interior of said box; and
   a clamping device wedged in said opening between said insulated conductor and said box, said clamping device comprising a wedge-shaped body tapering in thickness from one relatively thick end inside said box to a second relatively thinner end, and having a relatively larger transverse dimension at its thicker end than its transverse dimension at its thinner end, said body having its relatively thinner end located outside the box, and said relatively thinner end having a bifurcation therein receiving a portion of said conductor and located between two co-directionally extending parallel legs each resiliently flexible in a direction normal to said bifurcation and toward the other leg, said body further having
   a first side contiguous to said conductor;
   teeth on said first side extending transversely across said wedge-shaped body and normal to the bifurcation between said co-directionally extending parallel legs for impaling the insulation of the conductor;
   a second side opposite said side contiguous to said conductor; and
   transverse serrations on said second side engaged with said portion of said box defining one side of said rectangular opening, with said transverse serrations being located between said relatively thick end of said wedge-shaped body and said co-directionally extending parallel legs, said legs having smooth surfaces on their sides forming portions of said second side of said body.

2. A clamping device for clamping a conductor in a synthetic resin electrical box comprising:
   an elongated wedge body having a bifurcated end and a second end opposite said bifurcated end and further having opposed, longitudinally extending sides, said wedge body having a thickness, as measured between said sides, which is greatest at said second end and diminishes along the body in the direction of the bifurcated end;
   a plurality of contiguous teeth on each of said sides of said body extending transversely across said body;
   a pair of co-directionally extending, substantially parallel legs spaced from each other across the bifurcation in the bifurcated end of said body, each of said legs having a plurality of contiguous teeth on one side thereof aligned with the teeth on one side of said body, and having a smooth surface on the opposite side thereof from the side carrying said last-mentioned teeth;
   said last-mentioned one side of said body having a plurality of contiguous recessed areas spaced longitudinally therealong in alignment with the bifurcation in said bifurcated end of said body, said areas each being configured as a portion of a cylindrical surface and each defined by opposed, arcuate side edges meeting in points at the opposite ends of each area.

3. A clamping device as defined in claim 2 wherein said areas extend transversely of said body, and said areas include a first group of relatively large areas recessed relatively deeply into said body, and a second group of areas which are relatively smaller than said first areas, and are recessed relatively less deeply into said body than said first group of areas, said areas being arrayed so that a plurality of areas of said first group are disposed between a pair of the areas in said second group.

4. A clamping device for clamping a generally cylindrically shaped conductor in a synthetic resin electrical box at the location where the cylindrical conductor passes through a rectangular opening in said box comprising:
   an elongated synthetic resin wedge body having a first, relatively thick end and a second relatively thin end, said relatively thin end being relatively narrower in its transverse dimension than said relatively thick end of said wedge body, said relatively thin end of said wedge body having a bifurcation extending thereinto and defining a pair of codirectionally extending, substantially parallel legs, said wedge body further having opposed, longitudinally extending sides extending between said ends and transversely across said body, and said wedge body further including a plurality of contiguous, transversely extending elongated teeth on one of said sides extending from said relatively thick end to the location of said bifurcation in said legs, and said wedge body further having a second plurality of additional contiguous teeth on the opposite of said sides of said body extending from said relatively thick end to said relatively thin end of said wedge body, said opposite side of said wedge body further including a plurality of contiguous recessed concave areas each formed in the configuration of a portion of a cylindrical surface for engaging the outer surface of a cylindrical conductor.

* * * * *